United States Patent
Mamour et al.

(10) Patent No.: US 8,919,005 B2
(45) Date of Patent: Dec. 30, 2014

(54) ANALOGUE PROBE AND METHOD OF OPERATION

(75) Inventors: Khaled Mamour, Bristol (GB); Stephen Paul Hunter, Bristol (GB)

(73) Assignee: Renishaw PLC, Wotton-Under-Edge (GB)

(*) Notice: Subject to any disclaimer, the term of this patent is extended or adjusted under 35 U.S.C. 154(b) by 499 days.

(21) Appl. No.: 12/450,982

(22) PCT Filed: Apr. 30, 2008

(86) PCT No.: PCT/GB2008/001508
§ 371 (c)(1),
(2), (4) Date: Oct. 21, 2009

(87) PCT Pub. No.: WO2008/132483
PCT Pub. Date: Nov. 6, 2008

(65) Prior Publication Data
US 2010/0132207 A1    Jun. 3, 2010

(30) Foreign Application Priority Data

Apr. 30, 2007 (GB) .................................. 0708319.9
May 8, 2007 (WO) ................ PCT/GB2007/001667
Aug. 14, 2007 (GB) .................................. 0715799.3

(51) Int. Cl.
*G01B 5/008* (2006.01)
*G01B 5/012* (2006.01)
*G01B 5/00* (2006.01)

(52) U.S. Cl.
CPC .............. *G01B 5/012* (2013.01); *G01B 5/0014* (2013.01)
USPC ............................................. 33/503; 33/702

(58) Field of Classification Search
CPC ............ G01B 5/12; G01B 5/14; G01B 5/008; G01B 21/04
USPC ........... 33/503, 556, 558, 559, 561, 702–704, 33/1 M, 568–570, 573, 502
See application file for complete search history.

(56) References Cited

U.S. PATENT DOCUMENTS

| | | |
|---|---|---|
| 2,330,168 A | 8/1941 | Zimmermann |
| 4,428,055 A | 1/1984 | Kelley et al. |
| 4,574,199 A | 3/1986 | Pryor |
| 4,750,835 A | 6/1988 | McMurtry |

(Continued)

FOREIGN PATENT DOCUMENTS

| | | |
|---|---|---|
| DE | 42 11 813 C1 | 6/1993 |
| DE | 44 36 782 A1 | 4/1995 |

(Continued)

OTHER PUBLICATIONS

Harb et al.; "Resonator-based touch-sensitive probe;" *Sensors and Actuators A*; 1995; pp. 23-29; vol. 50.

(Continued)

*Primary Examiner* — R. A. Smith
*Assistant Examiner* — Tania Courson
(74) *Attorney, Agent, or Firm* — Oliff PLC

(57) ABSTRACT

An analogue probe for use with a coordinate positioning machine. The analogue probe comprises a temperature actuator which can be modulated so as maintain the temperature of at least a part of the analogue probe at a substantially constant predetermined temperature.

22 Claims, 2 Drawing Sheets

(56) References Cited

U.S. PATENT DOCUMENTS

| | | | |
|---|---|---|---|
| 4,979,284 A | | 12/1990 | McMurtry et al. |
| 5,001,842 A | * | 3/1991 | Wright et al. .................... 33/702 |
| 5,028,901 A | | 7/1991 | Enderle et al. |
| 5,101,548 A | | 4/1992 | McMurtry et al. |
| 5,179,786 A | | 1/1993 | Shelton |
| 5,247,751 A | | 9/1993 | Ohya et al. |
| 5,270,664 A | | 12/1993 | McMurtry et al. |
| 5,327,657 A | | 7/1994 | Hajdukiewicz et al. |
| 5,339,956 A | | 8/1994 | Thomason |
| 5,393,288 A | | 2/1995 | Miyasaka et al. |
| 5,517,190 A | | 5/1996 | Gunn |
| 5,646,049 A | | 7/1997 | Tayi |
| 5,675,902 A | | 10/1997 | Chase |
| 5,949,257 A | | 9/1999 | Ishikawa |
| 6,012,230 A | | 1/2000 | McMurtry et al. |
| 6,633,051 B1 | | 10/2003 | Holloway et al. |
| 6,708,420 B1 | | 3/2004 | Flanagan |
| 6,844,720 B1 | * | 1/2005 | Pokrywka .................... 324/202 |
| 7,041,963 B2 | | 5/2006 | El Rifai et al. |
| 7,096,077 B2 | | 8/2006 | Price et al. |
| 7,395,606 B2 | | 7/2008 | Crampton |
| 7,722,515 B2 | | 5/2010 | McMurty et al. |
| 7,735,234 B2 | | 6/2010 | Briggs et al. |
| 7,861,430 B2 | * | 1/2011 | Jonas et al. ..................... 33/503 |
| 8,381,588 B2 | | 2/2013 | Butter et al. |
| 8,430,331 B2 | * | 4/2013 | Butter et al. .................. 236/1 C |
| 8,474,148 B2 | * | 7/2013 | Jonas et al. ..................... 33/503 |
| 2003/0210235 A1 | | 11/2003 | Roberts |
| 2004/0184039 A1 | | 9/2004 | Christoph |
| 2004/0266595 A1 | | 12/2004 | Rosch |
| 2006/0129349 A1 | | 6/2006 | Raab et al. |
| 2006/0253206 A1 | | 11/2006 | Price et al. |
| 2010/0122920 A1 | | 5/2010 | Butter et al. |
| 2010/0132207 A1 | | 6/2010 | Mamour et al. |
| 2010/0135357 A1 | * | 6/2010 | Chancy .......................... 374/179 |
| 2010/0142798 A1 | * | 6/2010 | Weston et al. ................ 382/141 |
| 2010/0206068 A1 | | 8/2010 | Butter et al. |
| 2011/0061253 A1 | * | 3/2011 | Jonas et al. ..................... 33/503 |
| 2011/0264402 A1 | * | 10/2011 | Anderson et al. ............. 702/150 |

FOREIGN PATENT DOCUMENTS

| | | |
|---|---|---|
| DE | 44 42 247 A1 | 5/1996 |
| EP | 0 406 781 A2 | 1/1991 |
| EP | 0 690 286 A1 | 1/1996 |
| EP | 0 856 377 A1 | 8/1998 |
| GB | 2 006 435 A | 5/1979 |
| GB | 2 070 249 A | 9/1981 |
| GB | 2 295 565 A | 6/1996 |
| GB | 2 348 706 A | 10/2000 |
| GB | 2 407 718 A | 5/2005 |
| JP | A-54-146084 | 11/1979 |
| JP | A-61-047502 | 3/1986 |
| JP | A-02-152769 | 6/1990 |
| JP | A-07-167638 | 7/1995 |
| JP | A-09-285965 | 11/1997 |
| WO | WO 89/07745 A1 | 8/1989 |
| WO | WO 90/07097 A1 | 6/1990 |
| WO | WO 00/60310 A1 | 10/2000 |
| WO | WO 03/002296 A1 | 1/2003 |
| WO | WO 03/051575 A1 | 6/2003 |
| WO | WO 03/053630 A1 | 7/2003 |
| WO | WO 03/089188 A1 | 10/2003 |
| WO | WO 2004/007143 A1 | 1/2004 |
| WO | WO 2007/093789 A1 | 8/2007 |
| WO | WO 2007/129071 A1 | 11/2007 |
| WO | WO 2007/129075 A2 | 11/2007 |
| WO | WO 2007/129082 A1 | 11/2007 |
| WO | WO 2008/132484 A1 | 11/2008 |

OTHER PUBLICATIONS

International Search Report issued in International Application No. PCT/GB2008/001508; Mailed on Sep. 15, 2008.
British Search Report issued in Great Britain Application No. 0708319.9; Feb. 15, 2008.
British Search Report issued in Great Britain Application No. 0708319.9; Aug. 20, 2007.
British Search Report issued in Great Britain Application No. 0715799.3; Dec. 11, 2007.
International Search Report issued in International Application No. PCT/GB2007/001667; Mailed on Jan. 8, 2008.
U.S. Appl. No. 12/226,731, filed Oct. 27, 2008 in the name of Weston et al.
U.S. Appl. No. 12/450,983, filed Oct. 21, 2009 in the name of Butter et al.
U.S. Appl. No. 12/450,898, filed Oct. 21, 2009 in the name of Butter et al.
Oct. 23, 2012 Office Action issued in U.S. Appl. No. 12/450,983.
Nov. 11, 2012 Notice of Allowance issued in U.S. Appl. No. 12/450,898.
Feb. 21, 2012 Office Action issued in U.S. Appl. No. 12/450,898.
Jan. 18, 2013 Notice of Allowance issued in U.S. Appl. No. 12/450,983.
Sep. 20, 2013 Office Action issued in European Patent Application No. 08 750 492.4.
Jul. 30, 2010 Office Action issued in Chinese Patent Application No. 200720016525.2 (with English Translation).
Mar. 1, 2010 Communication pursuant to Article 94(3) EPC issued in European Application No. 07 732 696.5-2213.
Mar. 1, 2010 Communication pursuant to Article 94(3) EPC issued in European Application No. 08 737 151.4-2213.
Aug. 5, 2010 Office Action issued in Chinese Patent Application No. 200880014327.7 (with English Translation).
May 11, 2011 Office Action issued in Chinese Patent Application No. 200880014327.7 (with English Translation).
Sep. 6, 2013 Official Notice of Rejection issued in Japanese Patent Application No. 2010-504844 (with English Translation).
Mar. 8, 2013 Official Notice of Rejection issued in Japanese Patent Application No. 2010-504844 (with English Translation).
Sep. 9, 2010 Office Action issued in Chinese Patent Application No. 200880014255.6 (with English Translation).
May 30, 2011 Office Action issued in Chinese Patent Application No. 200880014255.6 (with English Translation).
Mar. 8, 2013 Official Notice of Rejection issued in Japanese Patent Application No. 2010-504849 (with English Translation).

* cited by examiner

ANALOGUE PROBE AND METHOD OF OPERATION

This invention relates to an analogue probe of the type used on coordinate positioning machines, such as coordinate measuring machines and the like.

Coordinate positioning machines typically comprise a base on which a work-piece to be worked on can be supported, a frame mounted on the base for holding a quill which in turn is suitable for holding, for instance, a work-piece inspection device for inspecting the work-piece. The base, frame and/or quill are typically configured such that the inspection device, such as a probe, can be moved relative to the base along at least one axis, and more typically along three mutually orthogonal axes X, Y and Z. Motors can be provided for driving the inspection device held by the quill along those axes. It is also known to provide an articulating head on the quill onto which the inspection device is located and by which the orientation of the inspection device can be controlled. Such an articulating head is for example described in EP360853, EP402440 and EP690286.

It is important that the predictability and repeatability of the inspection device's performance is guaranteed to be within a preferred tolerance range. For instance, it is important that a work-piece inspection device will always provide the same measurements for a given work-piece.

Accordingly, the invention relates to a probe, and in particular to an analogue probe, which has a temperature source which can be used to control the temperature of at least a part of the probe, and a method of operating such a probe so as to control its temperature.

According to a first aspect of the invention, there is provided a method of operating an analogue probe, the analogue probe comprising a temperature actuator, the method comprising: i) modulating the temperature actuator so as to maintain the temperature of the at least part of the analogue probe substantially at a predetermined temperature.

The inventors have found that, due to thermal expansion effects, changes in the temperature of the operating environment in which the analogue probe is used can significantly degrade the accuracy of the analogue probe. It is an advantage of the present invention that the temperature actuator can be used to control the temperature of the analogue probe so as to compensate for changes in the environmental temperature. This is advantageous as it can help avoids adverse temperature changes in the temperature sensitive parts of the analogue probe and therefore avoid erroneous measurements caused by such adverse temperature changes. For example, should the temperature of the operating environment decrease, the amount of heat emitted by the temperature actuator can be increased so as to counteract at least some temperature loss of the analogue probe to the operating environment, and vice versa. Accordingly, changes in the temperature of the operating environment will have a reduced adverse affect on the accuracy of the analogue probe.

Preferably the method comprises: i) modulating the temperature actuator so as to maintain the temperature of the at least part of the analogue probe at a substantially constant predetermined temperature. The temperature actuator can be referred to as a temperature regulator.

The analogue probe can be mounted on a coordinate positioning machine. In particular, the analogue probe can be mounted on a quill of a coordinate positioning machine. Accordingly, the method can be performed whilst the analogue probe is mounted on a coordinate positioning machine. This is advantageous as it enables the above mentioned variations in measuring accuracy to be avoided.

However, it will be understood that this need not necessarily be the case. For instance, the analogue probe could be located in a storage unit. For instance, the analogue probe could be mounted on a rack. Accordingly, the method can be performed whilst the analogue probe is located in a storage unit. This is advantageous because it can ensure that the analogue probe is at a predetermined temperature when it is loaded onto a coordinate positioning apparatus. This can help to avoid warm up/cool down delays and/or variations in measuring accuracy due to the analogue probe changing temperature.

The operating environment can include the surrounding air or other, fluid in which the analogue probe is used. The operating environment can also include parts of the coordinate positioning machine itself on which the analogue probe can be mounted. Accordingly, the method of the invention can be used to compensate for changes in the ambient temperature. The method of the invention can also be used to compensate for changes in the temperature of parts of the coordinate positioning machine which are in thermal conduction with the analogue probe. In particular, the method of the invention can be used to compensate for changes in the temperature of a part of the coordinate positioning machine on which the analogue probe is mounted. Preferably, the method of the invention can be used to compensate for changes in both the ambient temperature and also in the temperature of parts of the coordinate positioning machine which are in thermal conduction with the analogue probe.

Preferably the analogue probe is an analogue measurement probe for measuring the dimensions of a work-piece. As explained in more detail below, the analogue measurement probe can be a contact probe. The analogue measurement probe can be a non-contact probe. Measurement probes typically comprise a probe body which houses at least some of the sensor componentry for enabling measurement of the work-piece. Suitable analogue probes for use with the method of the present invention are discussed in more detail below.

The method can comprise modulating the temperature actuator so as to control the temperature of the entire analogue probe. The method can comprise modulating the temperature actuator so as to control the temperature of the probe body. Optionally, the method can comprise modulating the temperature actuator so as to control only one or more temperature sensitive parts of the analogue device. Temperature sensitive parts can comprise the sensor componentry in a probe body which enable measurement of the work-piece. For instance, in an stylus deflection probe described in more detail below, the sensor componentry can comprise those parts which enable detection of the stylus deflection. For example, in an optical contact probe as described in more detail below, the temperature sensitive parts can comprise the position sensor. In this embodiment, the temperature sensitive parts can also comprise the laser light source.

Modulating the temperature actuator can comprise setting the temperature actuator to one of at least three different possible temperature settings. The temperature actuator could be configured such that it has a plurality of discrete temperature settings. For instance, the temperature actuator could be a digital temperature actuator. Optionally the temperature actuator could be configured such that it can be set at any temperature setting within a predetermined range. For instance, the temperature actuator could be an analogue temperature actuator.

Preferably, the method comprises modulating the temperature actuator to control the temperature of the probe body so as to compensate for changes in the temperature of the operating environment in which the probe body is being used. The temperature actuator can be modulated so as to isolate the sensor componentry in the probe body from any such temperature change. For instance, in an optical contact probe, the temperature actuator can be modulated so as to isolate the position sensor from any change in the operating environment's temperature. The temperature actuator can be located distal to the sensor componentry in the probe body. The temperature actuator can be located toward the perimeter of the probe body. This can be preferable in probes in which temperature sensitive components are located toward the centre of the probe body. This is often the case in optical contact probes in which the position sensor is located toward the centre of the probe body so that it is coaxial with the hollow stylus.

It can be preferred that the temperature actuator is operable so as to be able to keep the temperature of the analogue probe within a predetermined tolerance range of the predetermined temperature. The preferred tolerance range can depend on many factors such as the accuracy requirements and the type of analogue probe. Preferably the tolerance level is not more than 2° C. above or below the predetermined temperature, more preferably not more than 1° C., especially preferably not more than 0.2° C.

The method can comprise controlling the temperature actuator on the basis of information about the operating environment in which the analogue probe is used. For instance, the method can comprise monitoring the temperature of the operating environment and controlling the temperature actuator in response to changes in the temperature. This can include taking measurements at more than one location. For instance, the method can comprise determining the ambient temperature. Optionally, the method can comprise determining the temperature of a part of the coordinate positioning machine. The method need not comprise directly measuring the temperature of a part of the coordinate positioning machine. For instance, the method can comprise determining the operation of a part of the coordinate position machine which would affect the temperature of the analogue probe and modulating the temperature actuator in response thereto. As an example, the method can comprise determining the operation of a head on which the analogue probe is mounted and modulating the temperature actuator in order to compensate for changes in the temperature of the head caused by the operation.

Preferably, the method further comprises measuring the temperature of the analogue probe via a temperature sensor. This is advantageous as it can provide a more accurate determination of the temperature of the analogue probe than by estimating it. The temperature sensor can be provided separately to the analogue probe. Preferably, the analogue probe comprises the temperature sensor. Preferably, the probe body comprises the temperature sensor. This increases the ease and accuracy of the measurement of the temperature of the analogue probe. The method can comprise modulating the heat source in response to the detection of a change of temperature of the analogue probe.

The method can comprise operating the temperature actuator to remove heat from the analogue probe. This can be done in order to compensate for an increase in the temperature of the operating environment. In this case, the temperature actuator can be a cooling device, as discussed in more detail below. The method can comprise operating the temperature actuator to supply heat to the analogue probe. This can be done in order to compensate for a decrease in the temperature of the operating environment. In this case, the temperature actuator can be a heat source, as discussed in more detail below.

The predetermined temperature could be determined by a source external to the measurement probe. The external source could be a user, e.g. a human operator, of the analogue probe. That is the method could comprise a user setting the predetermined temperature at which the temperature actuator maintains the temperature of the at least part of the measurement probe. The external source could be a computer or other processor device. That is the method could comprise a computer or other processor device setting the predetermined temperature at which the temperature actuator maintains the temperature of the at least part of the measurement probe. The computer or other processor device could automatically calculate the predetermined temperature based on one or more factors. Such factors could include the environment in which the analogue probe is used. Such factors could also include the type of operation in which the measurement probe is to be used. Such factors could also include the type of the analogue probe.

The method can comprise, prior to step i) modulating the temperature actuator so as to set the temperature of the analogue probe to a predetermined temperature. The predetermined temperature could be a temperature above or below ambient temperature. This is advantageous as it enables the temperature of the analogue probe to be maintained at a constant level via a temperature actuator which comprises only a heat source or only a cooling device. As will be understood, whether the temperature of the analogue probe is set above or below the ambient temperature can depend on whether the temperature actuator can be operated to add heat to or remove heat from the analogue probe.

Preferably, the method comprises, prior to step i) modulating the temperature actuator so as to heat the analogue probe to a predetermined temperature above ambient temperature. This is advantageous as it enables the method to compensate for reductions in the ambient temperature even when the temperature actuator comprises a heat source only. As will be understood, the preferred amount above ambient to which the analogue probe is heated is dependent on a number of factors, including the temperature range of the operating environment in which the analogue probe is to be used. Preferably, the analogue probe is heated to not more than 15° C. above ambient, more preferably not more than 10° C. above ambient. Preferably, the analogue probe is heated to not less than 1° C. above ambient. Preferably, the analogue probe is heated to the maximum temperature the analogue probe will reach due to the temperature of the operating environment.

The predetermined temperature could be set by a user. The method could comprise a temperature control device receiving a maximum or a minimum temperature that the analogue probe will reach due to changes in the temperature of the operating environment. The method could further comprise the temperature control device modulating the temperature actuator so as to set the temperature of the analogue probe to at least the received maximum or minimum temperature.

Optionally, the predetermined temperature could be calculated based on properties of the current operating environment. For instance, the method can comprise determining the temperature range of the environment in which the probe will be used and modulating the temperature actuator so as to set the analogue probe at a predetermined temperature outside of the temperature range. Accordingly, the predetermined temperature can be a value determined from the environmental temperature range prior to operation. Optionally, the method can comprise determining the temperature of the probe body and modulating the temperature actuator so as to set the temperature of the probe body to a predetermined value above or below the determined temperature.

Suitable temperature actuators and suitable temperature sensors for use in the method of the present invention are discussed in more detail below.

According to a second aspect of the invention, there is provided an analogue probe for use with a coordinate positioning machine, the analogue probe comprising a temperature actuator which can be modulated so as maintain the temperature of at least a part of the analogue probe at a predetermined temperature It is an advantage of such an analogue probe that the temperature actuator can be operated so as to compensate for adverse changes in the temperature of the operating environment in which the analogue probe is used. This can help avoid measurement errors caused by adverse changes in the temperature of the operating environment. Also, the analogue probe of the invention can also reduce the time required to wait for the analogue probe to reach a predetermined temperature once it is loaded onto a coordinate positioning apparatus.

Preferably the temperature actuator could be configured such that it can be modulated so as to maintain the temperature of the at least part of the analogue probe at a substantially constant predetermined temperature. The temperature actuator can be referred to as a temperature regulator.

There are many suitable temperature actuators for use with the present invention. For instance, the temperature actuator can be a cooling device. As will be understood, suitable cooling devices comprise any such devices which are operable to remove heat from the analogue probe. For instance, the temperature actuator can comprise a Peltier device.

Preferably, the temperature actuator comprises a heat source. Preferably, the temperature actuator comprises a heating element. Preferably, the temperature actuator comprises a resistor. The temperature actuator can comprise a variable resistor. Preferably, the heat emitted by the temperature actuator can be controlled by the amount of electrical power supplied to the heat source.

The temperature actuator can comprise more than one source of heating and/or cooling. When the temperature actuator comprises at least one heat source and at least one cooling device, the temperature actuator could be operated either to cool or to heat the analogue probe.

Preferably, the analogue probe further comprises a temperature sensor for determining the temperature of the analogue probe. The analogue probe can comprise more than one temperature sensor. This is advantageous because it enables the temperature of the analogue probe to be measured at more than one location. Preferably, the temperature sensor is a thermistor.

As will be understood, analogue probes are what are referred to in the metrological industry as probes which can measure more than two states. That is they can measure a range of values. Accordingly, analogue probes are to be distinguished from what are commonly referred to as dual state probes or touch trigger probes which can measure two states only, such as for example whether or not the probe's stylus is deflected. Examples of analogue probes are discussed in more detail below. Analogue probes are also commonly referred to in the metrological industry as scanning probes.

Preferably, the analogue probe is a measurement probe for measuring the dimensions of the work-piece. The analogue measurement probe can be a contact probe. The analogue measurement probe can be a non-contact probe.

Measurement probes typically comprise a probe body which houses at least some of the electronic componentry for measuring the work-piece.

Contact probes normally comprise a stylus attached to the probe body. The stylus normally comprises a tip for contacting a workpiece. Suitable contact probes include stylus deflection probes. Stylus deflection probes operate by detecting the deflection of the stylus when it is driven against a workpiece. Componentry for detecting deflection of the stylus is typically housed within the probe body.

As will be understood, in embodiments in which the analogue probe is an analogue stylus deflection probe, the analogue probe can measure the extent of the deflection of the stylus. The analogue probe could be an optical stylus deflection probe. For example, such a probe is disclosed in published International patent application no. PCT/GB00/01303 under publication no. WO 00/60310, the entire content of which is incorporated into this specification by this reference. In this case, stylus deflection can be detected by, for example, monitoring the position of a beam of light on a position sensor, the position of the light beam being dependent on the relative position of the stylus tip and the probe body. The stylus of such a probe is typically hollow along at least a part of its length. The probe body can, comprise the position sensor. In this case, the light beam source can be located toward the stylus tip. Optionally, the probe body can comprise the light beam source. The stylus can comprise a reflector towards its tip.

The analogue probe can be a non-contact probe in which the probe can measure the dimensions of the workpiece without contacting the workpiece. Non-contact probes include optical probes, capacitive probe and inductive probes, such as those disclosed in U.S. Pat. Nos. 4,750,835 and 5,270,664, the contents of which are incorporated into this specification by these references. The sensors of non-contact probes are typically contained within the probe body.

In certain circumstances, stylus deflection contact probes and non-contact probes can be preferred to rigid stylus contact probes as they can permit a degree of over-travel of the probe. That is, such so called over-travel probes can be driven, by the machine on which they are mounted, beyond the initial point at which they can take a measurement of a workpiece, without risk of damage to the probe. With rigid stylus contact probes, there can be significant risk of damage to the probe if the machine on which it is mounted continues to drive the stylus into the workpiece beyond its initial point of contact with a workpiece.

The temperature actuator could be configured such that the temperature of the entire analogue probe can be controlled. The temperature actuator could be configured such that the temperature of the probe body can be controlled. Optionally, the temperature actuator could be configured such that only one or more temperature sensitive parts of the analogue probe can be controlled.

A temperature control device could be provided for modulating the temperature actuator. The temperature control device could be configured to modulate the temperature actuator in accordance with the method described above. For instance, the temperature control device could be configured to monitor for changes in the temperature of the analogue probe via a temperature sensor, and to modulate the temperature actuator so as to counteract any such change. Optionally, the temperature control device could be configured to monitor for changes in the environment in which the analogue probe is used and to modulate the temperature actuator so as to counteract any such change.

The temperature control device could be located remote to the analogue probe. Accordingly, the analogue probe can comprises an interface for communication with a temperature control device remote to the analogue probe which is configured to control the temperature of the heat source. The interface can be a wireless interface so as to enable wireless communication with the temperature control device. This is advantageous because it avoids the need to provide data cables between the analogue probe and the temperature control device. The interface can comprise at least one data connector for connecting to corresponding data connectors on a coordinate positioning machine for communication with a temperature control device. Accordingly, the analogue probe can output data and receive data along a wired communication link. This is advantageous as it avoids the need to provide wireless communication components which can consume a relatively large amount of power. The temperature control device can be part of a control device for a coordinate positioning machine to which the analogue probe is to be used with.

Preferably, the analogue probe comprises the temperature control device. Preferably, the probe body comprises the temperature control device.

The analogue probe can comprise an input device via which a user can input a target temperature. The temperature control device can be configured to modulate the temperature actuator so at to maintain the temperature of at least a part of the analogue probe at the target temperature.

The analogue probe can comprise an electrical power source for powering the temperature actuator. This is advantageous as it can avoid the need for any electrical connection between the analogue probe and any other part of the coordinate positioning machine, especially when the analogue probe comprises a wireless interface. The analogue probe can comprise at least one power connector for connecting to corresponding power connectors on an external device for supplying electrical power to the analogue probe. For instance, the analogue probe can comprise at least one power connector for connecting to corresponding power connectors on coordinate positioning machine for supplying electrical power to the analogue probe. Optionally, the analogue probe can comprise at least one power connector for connecting to corresponding power connectors on a measurement probe storage apparatus for supplying electrical power to the analogue probe. This is advantageous as it avoids the need to provide an electrical power source within the analogue probe and therefore enables the analogue probe to be more compact. The power connectors can be provided on the face of the analogue probe which is for connection to the coordinate positioning machine.

The power connector can also be a data connector. This is especially advantageous when the temperature actuator is controlled by the amount of power supplied to it.

According to a third aspect of the invention, there is provided, a coordinate positioning apparatus, comprising: a coordinate positioning machine; and an analogue probe comprising a temperature actuator which can be modulated so as maintain the temperature of at least a part of the analogue probe at a substantially constant predetermined temperature.

Accordingly, the temperature actuator can be modulated so as to compensate for a change in the temperature of the operating environment in which the analogue probe is used.

Preferably, the analogue probe further comprises a temperature sensor for determining the temperature of the analogue probe. Preferably, the coordinate positioning machine further comprises a temperature control device configured to receive a temperature signal from the temperature sensor and to modulate the temperature actuator so as to maintain the temperature of the analogue probe at an operating temperature.

The analogue probe can be a analogue probe as described above. The temperature actuator can be operated in accordance with the method described above.

Preferably, the coordinate positioning machine comprises a control device for operating the coordinate positioning machine. In particular, preferably, the control device comprises a coordinate positioning control device for controlling the position of a analogue probe mounted on the coordinate positioning machine. The control device can comprise a temperature control device for modulating the temperature actuator of a analogue probe mounted on the coordinate positioning machine in accordance with the method described above. Optionally, the analogue probe can comprise the temperature control device.

An embodiment of the invention will now be described, by way of example only, with reference to the following drawings, in which.

Figure 1:
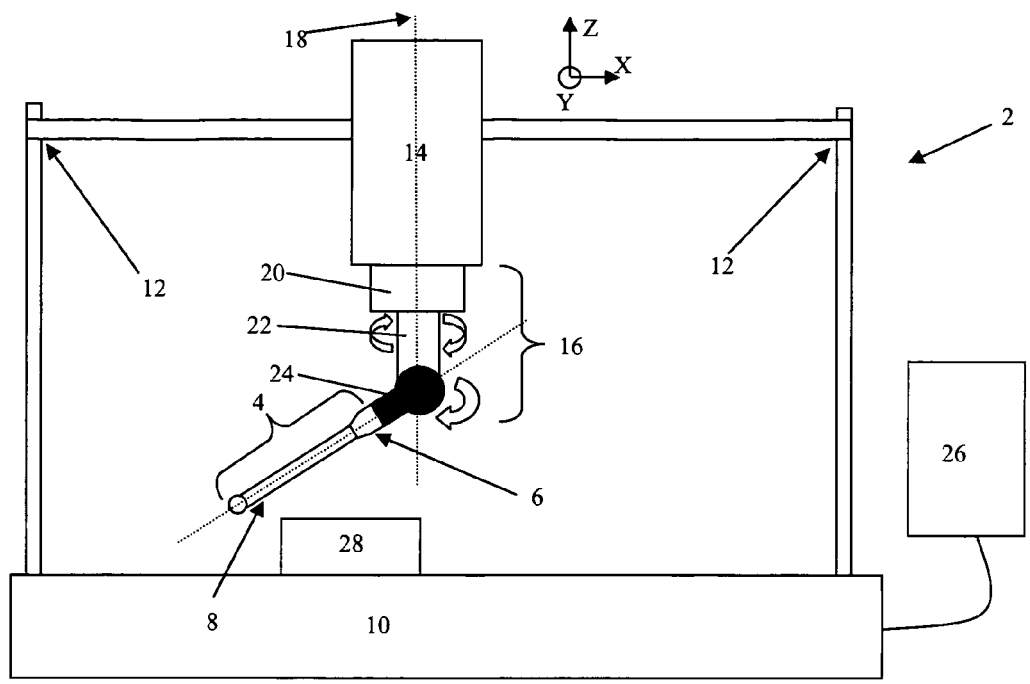
FIG. 1 shows a probe body according to the present invention mounted on a coordinate measuring machine.
Figure 2:
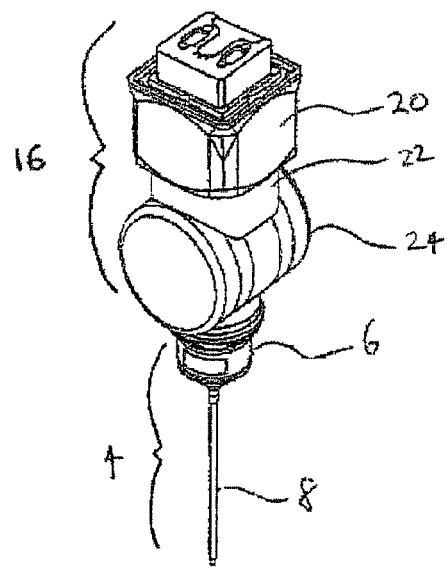
FIG. 2 shows a perspective view of the head and the probe shown in FIG. 1.

Referring to FIGS. 1 and 2, a coordinate measuring machine (CMM) 2 on which an analogue measurement probe 4, comprising a probe body 6 according to the present invention and a stylus 8, is mounted is shown.

The CMM 2 comprises a base 10, supporting a frame 12 which in turn holds a quill 14. Motors (not shown) are provided to move the quill 14 along the three mutually orthogonal axes X, Y and Z. The quill 14 holds an articulating head 16. The head 16 has a base portion 20 attached to the quill 14, an intermediate portion 22 and a probe retaining portion 24. The base portion 20 comprises a first motor (not shown) for rotating the intermediate portion 22 about a first rotational axis 18. The intermediate portion 22 comprises a second motor (not shown) for rotating the probe retaining portion 24 about a second rotational axis that is substantially perpendicular to the first rotational axis. Although not shown, bearings may also be provided between the moveable parts of the articulating head 16. Further, although not shown, measurement encoders may be provided for measuring the relative positions of the base 10, frame 12, quill 14, and articulating head 16 so that the position of the measurement probe 4 relative to a workpiece located on the base 10 can be determined.

The probe body 6 is removably mounted (e.g. using a kinematic mount) on the probe retaining portion 24. The probe body 6 can be held by the probe retaining portion 24 by the use of corresponding magnets (not shown) provided on or in the probe body 6 and probe retaining portion 24. In the described embodiment, the stylus 8 is removably mounted (e.g. using a kinematic mount) on the probe body 6. This allows different types of stylus 8 to be used on the same probe body 6. As will be understood, in other embodiments, the stylus 8 and probe body 6 might be fixed to each other such that they are provided as a single piece. In the embodiment described, the measurement probe 4 is an optical contact probe. However, as will be understood, the probe need not be an optical contact probe. For example, the measurement probe may be a non-contact probe, in which case the measurement probe will not comprise a stylus for contacting the workpiece. Rather, the probe body 6 will comprise a non-contact scanner, for example an optical scanner for measuring the workpiece.

The probe body 6 has electrical contacts (not shown) on its face which opposes the head 16. The electrical contacts connect to corresponding electrical contacts (not shown) on the head 16. The electrical contacts on the head 16 are in turn connected to the machine controller 26 via wires (not shown) extending through the head 16 and quill 14. The electrical contacts can be used to provide electrical power to the probe body 6 and also to allow data (for instance measurement data) to be exchanged from the probe body 6 to the machine controller for use in a measurement operation. As will be understood, the measurement data could be transmitted using other methods. For instance the measurement data could be transmitted using wireless methods, such as via a Bluetooth protocol, to the machine controller.

The head 16 allows the measurement probe 4 to be moved with two degrees of freedom relative to the quill 14. The combination of the two degrees of freedom provided by the head 16 and the three linear (X, Y, Z) axes of translation of the CMM 2 allows the measurement probe 4 to be moved about five axes. This permits so called "five-axis" measurements of an associated part 28 mounted to the base portion 10 of the machine.

A machine controller 26 for controlling the operation of the CMM 2 is also provided. The machine controller 26 may be a dedicated electronic control system and/or may comprise a personal computer.

The machine controller 26 is arranged to provide appropriate drive currents to the first and second motors so that, during use, each motor imparts the required torque. The torque imparted by each motor may be used to cause movement about the associated rotational axis or to maintain a certain rotational position. It can thus be seen that a drive current needs to be applied continuously to each motor of the head 16 during use; i.e. each motor needs to be powered even if there is no movement required about the associated rotational axis.

It should be noted that FIG. 1 provides only a top level description of a CMM 2. A more complete description of such apparatus can be found elsewhere; for example, see EP402440 the entire contents of which are incorporated herein by this reference.

Figure 3A:
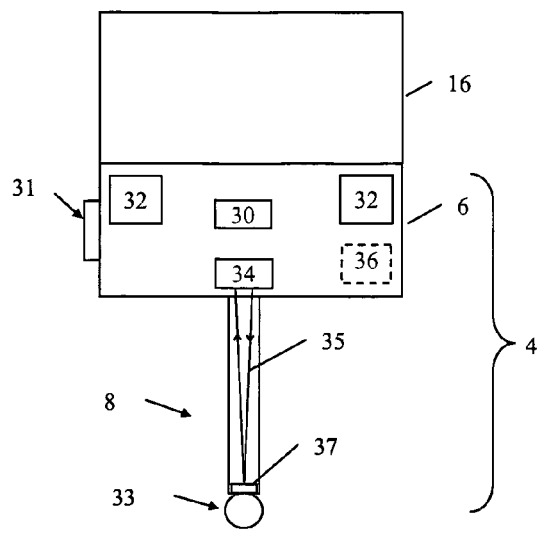
FIG. 3a is a schematic side view of the components of the probe body shown in FIG. 1.
Figure 3B:
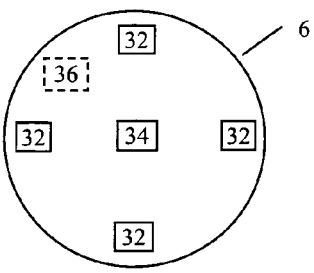
FIG. 3b is a schematic plan view of the components of the probe body shown in FIG. 1.

Referring now to FIGS. 3a and 3b, the probe 4 comprises a hollow stylus 8 which has a reflector 37 located towards its workpiece contacting tip 33. The probe body 6 comprises measuring instrumentation schematically illustrated by block 34 for measuring the deflection of the stylus 8, a temperature sensor 30 and a plurality of heat sources 32. The measuring instrumentation 34 can measure the extent by which the stylus 8 is deflected rather than just whether or not the stylus is deflected.

In the embodiment described, the temperature sensor 30 is a thermistor and the heat sources 32 are resistors. Furthermore, the accuracy of the measuring instrumentation 34 is dependent on its temperature. The heat sources 32 are located as close to the perimeter of the probe body 6 as possible so that they are as far away as possible from the measuring instrumentation 34. This helps to isolate the measurement instrumentation from significant temperature changes. The heat sources 32 are also equally spaced around the perimetral edge of the probe body 6 so as to help provide a uniform temperature across the probe body 6. The temperature sensor 30 is located between the heat sources 32 and the temperature sensitive measuring instrumentation 34.

The probe body also comprises an input dial 31 which enables the user to input the maximum temperature to which the probe body 6 should be heated, i.e. the target temperature, as explained in more detail below. As will be understood, other types of input mechanism are suitable for inputting the maximum temperature to which the probe body 6 should be heated. For instance, a switch or keypad could be provided in order for the user to input the maximum temperature. Furthermore, the input device need not be provided on the probe body 6. For example, the input device could be provided on, or as part of the machine controller 26.

The probe body 6 receives electrical power for its components through electrical connectors (not shown) from a power source (not shown) in the machine controller. As will be understood, this need not necessarily be the case. For instance, the probe body 6 could comprise a power source.

The measuring instrumentation 34 comprises an optical beam source (not shown) for emitting an optical beam 35 through the hollow stylus 8 towards the reflector 37. The optical beam 35 is reflected off the reflector 37, back towards the measuring instrumentation 34 where it falls on a position sensitive device (PSD) (not shown). The position of the optical beam 35 on the PSD varies with the deflection of the stylus 8 relative to the probe body 6. Accordingly, deflection of the stylus 8 can be determined by monitoring the position of the optical beam 35 on the PSD. When deflection is detected, the position of the workpiece contacting tip can be determined from the relative position of the different parts of the CMM 2, which can be read, for example, from encoders mounted on them. As will be understood, only a top level description of the workings of an optical contact probe have been provided. A more complete description of such an optical contact probe can be found elsewhere; for example, see WO 00/60310 the entire contents of which are incorporated herein by this reference.

Figure 4:
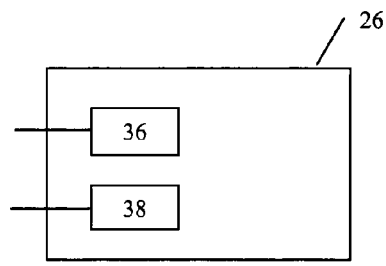
FIG. 4 is a schematic view the machine controller shown in FIG. 1.

Referring now to FIG. 4, the machine controller 26 comprises a temperature controller 36. This is configured to receive the maximum temperature value input via the input dial 31 and also to receive temperature data from the temperature sensor 30. The temperature controller 36 is also configured to modulate the heat source 32. The machine controller 26 further comprises a coordinate position controller 38 for receiving information from the measuring instrumentation 34 and for controlling the CMM 2.

In an alternative embodiment and as illustrated by the phantom-lined box 36 in FIGS. 3a and 3b the probe body 4 can comprise the temperature controller 36 instead of the machine controller 26. This can be advantageous as the measurement probe 4 itself has a self-contained servo-loop for controlling the temperature of the probe body 6. This avoids the need to provide communication to and from the measurement probe 4, at least for temperature control purposes. Accordingly, in this case there would be no need for a temperature controller 36 in the machine controller 26.

Figure 5:
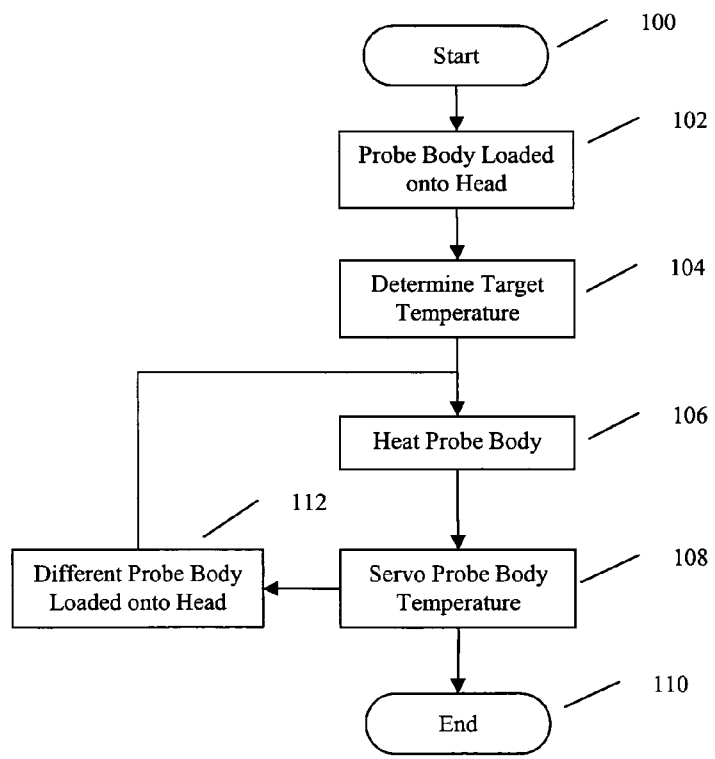
FIG. 5 is a flow chart illustrating the method of controlling the temperature of the probe body shown in FIG. 1.

With reference to FIG. 5, a method of controlling the temperature of the probe body 6 will now be described. The method described is the same regardless of whether the temperature controller 36 is located in the machine controller 26 or the probe body 6.

The method begins at step 100 when the machine controller 26 is powered up. At step 102, a probe body 6 is loaded onto the probe retaining portion 24. This can be done manually, e.g. by a user placing the probe body 6 on the probe retaining portion 24, or automatically, e.g. by the coordinate position controller 38 of the machine controller 26 operating the CMM 2 so that the probe retaining portion 24 picks up a probe body 6 from a storage device located within the workspace of the CMM 2. A suitable storage device includes that disclosed in co-pending UK Patent Application no. 0708319.9, the entire contents of which are incorporated by this reference.

At step 104, the temperature controller 36 of the machine controller 26 determines the target temperature. In the embodiment described, the target temperature is determined from the maximum temperature value input via the input dial 31. The input dial 31 can be manually adjusted by a user to indicate the maximum temperature to which the probe body 6 could be heated due to the increases in the operating environment's temperature, which includes increases in the temperature of the CMM 2 (in particular the articulating head 16) as well as increases in the ambient temperature. The user could set the maximum temperature prior to, or after, the probe 4 has been loaded onto the probe retaining portion 24.

As will be understood the target temperature need not necessarily be input by user. For instance, the temperature controller 36 could be preconfigured with the target temperature. Optionally, the target temperature could be set to be a predetermined amount above the temperature of the probe body 6 on loading onto the probe retaining portion which can be measured via the temperature sensor 30.

At step 106 the temperature controller 36 operates the heat source 32 so as to heat the probe body 6 until its temperature, measured by the temperature sensor 30, reaches the target temperature.

Once the probe body 6 has reached its target temperature, the temperature controller 36 signals to the coordinate position controller 38 that the CMM 2 is now ready for use.

Of course, other setup routines can be performed during steps 104 and/or 106. For instance, in some embodiment it might be important to control the temperature of the head 16. In this case, the method might also include heating the head 16 to a predetermined temperature.

At step 108, the temperature controller 36 continuously monitors the temperature of the probe body 6 via the temperature sensor 30 and controls the amount of heat emitted by the heat sources 32 so as to maintain the temperature of the probe body 6 at the target temperature. The temperature controller 36 can control the amount of heat emitted by the heat sources 32 by controlling the amount of power supplied to them. Accordingly, if the temperature of the operating environment in which the probe body 6 is used remains constant, the temperature controller 36 will control the heat sources 32 such that a constant amount of heat is emitted by providing a constant amount of electrical power to the heat sources 32. However, should the temperature of the operating environment change, for instance if the ambient temperature changes or if the temperature of the head 16 changes, then this will likely cause a temperature change in the probe body 6. Any such temperature change is detected by the temperature controller 36 via the temperature sensor 30 and the amount of electrical power to the heat sources 32 is either increased or decreased so as to compensate for the changes in the environmental temperature and to keep the probe body 6 at the target temperature.

The temperature controller 36 continuously performs step 108 until either the power to the machine controller 26 is switched off at step 110, or until a different probe body 6 is loaded, onto the head 16 at step 112. When a different probe body 6 is loaded onto the head 16, then control loops back to step 106 at which point the probe body 6 is heated to the target temperature before the CMM 2 can begin operating.

As will be understood, the same method can be used to control the temperature of the probe body 6 even when it is not loaded onto a coordinate positioning apparatus. For instance, the same method could be used when the probe body 6 is loaded onto a storage rack. In this case, the method can begin whenever the probe is powered, either via the rack, via a coordinate positioning apparatus or via a power source internal to the probe. Suitable storage racks include those described in the co-pending PCT patent application filed by the same applicant and on the same day as this PCT patent application, titled A STORAGE APPARATUS, bearing agent's reference number 722WO and claiming priority from UK Patent Application no 0708319.9.

As will be understood, the probe body 6 could be powered by an internal battery, or by power from the coordinate positioning apparatus or storage rack supplied via power supply lines.

The embodiment described with reference to the Figures has been an embodiment in which a heat source is provided. However, as will be understood, the heat source could be replaced with a cooling device, for instance a Peltier device or the like. As will be understood, the above described method could therefore comprise operating the cooling device so as to reduce the temperature of the measurement probe to a target temperature. Furthermore, the target temperature referred to above could be a minimum temperature as opposed to a maximum the measurement probe is likely to reach.

The invention claimed is:

1. A method of operating an analogue probe, the analogue probe comprising a probe body which comprises at least some sensor componentry for enabling measurement of a workpiece, the probe body comprising a temperature actuator, the method comprising:
   i) modulating the temperature actuator so as to maintain the temperature of the entire probe body within a predetermined range of a predetermined temperature.

2. The method according to claim 1, wherein the analogue probe is mounted on a coordinate positioning machine.

3. The method according to claim 1, further comprising:
   prior to step i), determining the temperature range of the environment in which the probe will be used, and
   modulating the temperature actuator so as to set the probe body at a predetermined temperature outside of the temperature range.

4. The method according to claim 1, wherein step i) comprises measuring the temperature of the analogue probe via a temperature sensor.

5. The method according to claim 4, wherein the analogue probe comprises the temperature sensor.

6. The method according to claim 1, wherein the analogue probe is a contact probe.

7. The method according to claim 6, wherein
   the analogue probe is an optical stylus deflection probe, and
   stylus deflection is detected by monitoring the position of a beam of light on a position sensor, the position of the beam of light being dependent on the relative position of the stylus tip and the probe body.

8. The method according to claim 7, wherein
   the stylus is hollow along at least a part of its length,
   the stylus comprises a reflector towards its tip, and
   the probe body comprises a light beam source and the position sensor.

9. The method according to claim 1, wherein the analogue probe is a non-contact probe.

10. The method according to claim 1, further comprising:
    modulating the temperature actuator to control the temperature of the probe body so as to compensate for changes in the temperature of the operating environment in which the probe body is being used.

11. The method according to claim 1, further comprising:
controlling the temperature actuator on the basis of information about the operating environment in which the analogue probe is used.

12. An analogue probe for use with a coordinate positioning machine, the analogue probe comprising:
a probe body which comprises
at least some sensor componentry for enabling measurement of a workpiece, and
a temperature actuator which can be modulated so as maintain the temperature of the entire probe body within a predetermined range of a predetermined temperature.

13. The analogue probe according to claim 12, further comprising:
a temperature sensor for determining the temperature of the analogue probe.

14. The analogue probe according to claim 12, further comprising:
a temperature control device configured to modulate the temperature actuator.

15. The analogue probe according to claim 12, wherein the analogue probe is a contact probe.

16. The analogue probe according to claim 12, wherein the probe is a non-contact probe.

17. The analogue probe according to claim 12, wherein
the analogue probe is an optical stylus deflection probe, and
stylus deflection is detected by monitoring the position of a beam of light on a position sensor, the position of the beam of light being dependent on the relative position of the stylus tip and the probe body.

18. The analogue probe according to claim 17, wherein
the stylus is hollow along at least a part of its length,
the stylus comprises a reflector towards its tip, and
the probe body comprises a light beam source and the position sensor.

19. A coordinate positioning apparatus, comprising:
a coordinate positioning machine; and
an analogue probe comprising a probe body which comprises:
at least some sensor componentry for enabling measurement of a workpiece, and
a temperature actuator which can be modulated so as maintain the temperature of the entire probe body within a predetermined range of a predetermined temperature.

20. The coordinate positioning apparatus according to claim 19, wherein the analogue probe further comprises a temperature sensor for determining the temperature of the analogue probe, the coordinate positioning apparatus further comprising:
a temperature control device being configured to receive a temperature signal from the temperature sensor and to operate the temperature actuator so as to maintain the temperature of the probe body within the predetermined range of the predetermined temperature.

21. A method of operating an analogue probe mounted on a coordinate positioning machine, the analogue probe comprising a probe body which comprises at least some sensor componentry for enabling measurement of a workpiece, the probe body comprising a temperature actuator, the method comprising:
i) modulating the temperature actuator so as to control the temperature of the entire probe body.

22. The method according to claim 21, wherein step i) comprises modulating the temperature actuator so as to maintain the temperature of the probe body at a constant predetermined temperature.

* * * * *